(12) United States Patent  
Krawczak et al.

(10) Patent No.: US 7,499,603 B1
(45) Date of Patent: Mar. 3, 2009

(54) RANGE EXTENDED ELECTROOPTIC MODULATOR

(75) Inventors: John A. Krawczak, Minnetonka, MN (US); Raymond J. Johnson, Maplewood, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 373 days.

(21) Appl. No.: 11/335,128

(22) Filed: Jan. 19, 2006

(51) Int. Cl.
*G02F 1/01* (2006.01)
*G02F 1/295* (2006.01)
*G02B 27/00* (2006.01)

(52) U.S. Cl. ............... 385/1; 385/2; 385/3; 385/4; 385/8; 385/14; 359/245; 359/251; 359/252; 359/254; 359/279; 359/315; 359/316; 359/320; 359/578; 359/579

(58) Field of Classification Search ............ 385/1–4, 385/8, 14; 359/245, 251, 252, 254, 279, 359/315, 316, 320, 578, 579
See application file for complete search history.

(56) References Cited

U.S. PATENT DOCUMENTS

| | | | |
|---|---|---|---|
| 5,309,532 A | 5/1994 | Chang et al. | |
| 5,321,543 A | 6/1994 | Huber | |
| 5,515,199 A | 5/1996 | Farina | |
| 5,835,212 A * | 11/1998 | Kissa et al. | 359/245 |
| 5,991,471 A | 11/1999 | Yu | |
| 6,222,965 B1 * | 4/2001 | Smith | 385/40 |
| 6,246,350 B1 | 6/2001 | Yap | |
| 6,532,315 B1 | 3/2003 | Hung et al. | |
| 6,788,832 B2 | 9/2004 | Kawanishi et al. | |
| 6,791,733 B2 | 9/2004 | Kawanishi et al. | |
| 2002/0191266 A1 * | 12/2002 | Melloni et al. | 359/254 |
| 2003/0128417 A1 | 7/2003 | Kawanishi et al. | |
| 2003/0231372 A1 | 12/2003 | Steier et al. | |
| 2005/0123242 A1 | 6/2005 | Walker et al. | |
| 2005/0201759 A1 | 9/2005 | Wang et al. | |
| 2006/0120655 A1 * | 6/2006 | Walker | 385/4 |
| 2006/0198581 A1 * | 9/2006 | Belmonte et al. | 385/2 |

FOREIGN PATENT DOCUMENTS

EP   0 484 791   10/1991

* cited by examiner

*Primary Examiner*—Evelyn A. Lester
(74) *Attorney, Agent, or Firm*—Brooks, Cameron & Huebsch, PLLC

(57) ABSTRACT

Methods, systems, and devices are provided for an electrooptical modulator. One method embodiment includes receiving an optical input signal to an electrooptical modulator. A first voltage input is applied to a first drive electrode associated with a first optical path in the electrooptical modulator. A second voltage input is applied to a second drive electrode associated with a second optical path in the electrooptical modulator at times alternative to applying the first voltage input to the first drive electrode.

29 Claims, 4 Drawing Sheets

RANGE EXTENDED ELECTROOPTIC MODULATOR

FIELD OF THE DISCLOSURE

The present disclosure generally relates to optical components. And, in particular, the present disclosure relates to electrooptical modulators.

BACKGROUND

Light can be useful to transmit information across optical fiber that is the optical conduit in a photonic link. A photonic link can include an optical transmitter, a transmission medium, and an optical receiver. The transmission medium can include free space, optical fiber, and water, among other media. As an example of transmission, light can be useful to transmit voice and/or data information across optical fiber in long-distance telecommunication systems. As other examples, it can be useful to transmit RF analog sensor information across optical fiber in electronic warfare, radar, and communication systems, such as those found in aircraft, ships, and land transmission systems.

In order to transmit information across an optical fiber (or through another suitable medium, such as free space) the information can be encoded into an optical signal. A modulator can be used to encode information onto an optical signal.

A modulator can act as an iris to change the intensity of the light beam, i.e., amount of light, passing through the modulator to various intensity levels. This type of modulation is often used in transmitting analog information.

A modulator can also act as a shutter to control the intensity of the beam by changing the intensity between two intensity levels, such as by turning the beam of light on and off. These types of modulators are often used in transmitting digital information.

An electrooptic modulator can be used to convert information in an electronic signal to an optical signal. Electrooptic modulators can be of an analog or digital type. Examples of electrooptic modulators include electroabsorption modulators and interferometric Mach-Zehnder modulators. Mach-Zehnder modulators can include lumped and traveling wave designs, among others.

There are several factors that determine the performance of a modulator, such as, bandwidth, modulator drive, and transfer function nonlinearity, to name a few. Bandwidth refers to the number of times that the modulator can effectively perform a change through its entire light beam intensity range during a period of time. Modulator drive refers to the electrical voltage or current used to actuate the modulator to change the intensity of the light beam. Transfer function nonlinearity determines the extent to which a modulator produces distortions of an analog signal voltage applied to it. Distortions can include harmonics of an input signal and mixing products of multiple simultaneous input signals, among others.

Mach-Zehnder interferometric modulators rely on two physical effects to vary the light intensity. These effects are: a susceptibility of the velocity of light to an electric field, as the light travels through a material, and the concept of optical interference. In a Mach-Zehnder interferometer, an optical splitter divides the incoming light beam into two optical paths and a combiner recombines the beams at the outputs of the optical paths.

An electrical adjustable delay element controls the optical path length in one of the optical paths resulting in a phase difference between the two beams when they are recombined. The adjustable delay element is provided through use of an electric field that is applied to the optical paths in which the split light beams are traveling.

For example, a voltage creates an electric field across the optical path which causes the light beam traveling through the optical path to either be in phase or out of phase with the light beam traveling in the other optical path. When the light beams are recombined, the phases of the light beams can: cancel each other out, subtract from each other, or add together. This results in the light being passed through the modulator at various intensities. In this way, the light beam can be encoded with information as a series of changes in intensity for transmitting analog information or as on/off pulses of light for transmitting digital information.

Various devices have been used for RF transmission in free space or on transmission lines. These devices can exhibit nonlinear transfer functions. Many approaches have been introduced to compensate for or circumvent nonlinearities in electrical RF transmission. In one approach, switched attenuators are used to limit signal intensity when a signal is sufficiently intense to cause a distortion when passed through a transmission link. Further, this approach utilizes additional devices and extra circuitry and can limit performance in other aspects of a transmission system.

SUMMARY

Embodiments of the present disclosure provide methods, devices, and systems, for an electrooptic modulator that can limit distortion of RF signals conveyed through a transmission system by the modulator.

In various embodiments, a method of modulating an optical signal can include receiving an optical input signal to an electrooptical modulator. These various embodiments can include applying a first voltage input to a first drive electrode associated with a first optical path in the electrooptical modulator. These method embodiments can also include applying a second voltage input to a second drive electrode associated with a second optical path in the electrooptical modulator at times alternative to applying the first voltage input to the first drive electrode. In various embodiments, the optical signal can be a light source such as a laser light source or other light source capable of being electrooptically modulated.

Such method embodiments can include applying the first voltage in various ways. For example, such a method embodiment can include applying the first voltage input to the first drive electrode having a first electrode length different from a second electrode length of the second drive electrode. In various embodiments of this example, the first electrode length can be longer than the second electrode length. In some method embodiments, applying a first voltage input to a first drive electrode can include applying a first voltage input which is lower than the second voltage input.

In various embodiments, a method of modulating an optical signal can include applying a first voltage input to a first drive electrode that is a different distance from a first optical path than the distance that a second drive electrode is from a second optical path.

A method of modulating an optical signal can, in various embodiments, include applying a first voltage input to a first drive electrode until a particular voltage is reached. Once the particular voltage has been reached, these embodiments can also include discontinuing to apply the first voltage input to the first drive electrode and switching to apply a second voltage input to a second drive electrode.

In an embodiment, a method of modulating an optical signal, can include receiving an optical input signal to an electrooptical modulator. This embodiment can include applying a first voltage input to a first drive electrode of the modulator, having a first electrode length, until a particular event occurs.

In some embodiments, the particular event can be a manual selection by a user. Examples of events can also include reaching or exceeding a threshold, such as a predetermined voltage, a predetermined intensity, or other such thresholds. An event can also be triggered at a particular distortion limit in the output RF signal from the photonic link, for example. This method embodiment can also include discontinuing to apply the first voltage input to the first drive electrode and switching to apply a second voltage input to a second drive electrode, having a second electrode length different from the first electrode length, once the particular event occurs. In various embodiments, the switching can be manual or automatic. Some method embodiments can include applying a first voltage input which is lower than a second voltage input and/or applying a first voltage input to a first electrode length which is longer than a second electrode length.

In various device embodiments, an electrooptical modulator can include an optical signal input, an optical signal output, and a first optical path from the input to the output, wherein the first optical path is associated with a first drive electrode having a first drive electrode length. These modulator embodiments can include a second optical path from the input to the output, wherein the second optical path is associated with a second drive electrode having a second drive electrode length. As an example, the first drive electrode length can be longer than the second drive electrode length.

In such modulator embodiments, the modulator can be configured in various ways. For example, a modulator can be configured, in various embodiments, such that a first voltage input is applied to a first drive electrode at times different from a second voltage input being applied to a second drive electrode. A modulator can be configured, in some embodiments, such that a first voltage input applied to a first drive electrode is lower than a second voltage input. In a modulator embodiment, a first voltage input is applied to a first drive electrode until a particular voltage is reached. Once the particular voltage has been reached, in this embodiment, a second voltage input can be applied to a second drive electrode.

In various embodiments, the first applied voltage and the second applied voltage can be based on an intensity of a radio frequency (RF) signal. For example, the RF signal can be directed into the modulator or a switch controlling the first and second drive electrodes or other associated circuitry. In some embodiments, a RF receiver can receive the RF signal and can include logic circuitry to convert a sample of the RF signal, having a particular intensity, into an electric signal. The electrical signal can correspond to a particular voltage input. The voltage input can then be applied to the first drive electrode or second drive electrode depending on, for example, whether the particular voltage threshold has been reached (e.g., whether a received RF signal intensity is above or below a particular level).

In a number of device embodiments, an electrooptical modulator can include an optical signal input, an optical signal output, and a first optical path from the input to the output, wherein the first optical path is associated with a first drive electrode having a first drive electrode length, the modulator being configured to have a voltage applied to the first drive electrode until a particular event occurs.

In such device embodiments, the electrooptical modulator can also include a second optical path from the input to the output, wherein the second optical path is associated with a second drive electrode having a second drive electrode length, the modulator being configured to have the voltage applied to the second drive electrode once the particular event occurs. An embodiment of an electrooptical modulator can include, in various embodiments, a first drive electrode length that is longer than a second drive electrode length. For example, a length ratio of a first drive electrode to a second drive electrode of 3 to 1 can result in an increased input voltage range of 9 times that of a modulator having two equal length electrodes that are the length of the first drive electrode without generating distortion.

The modulator can be configured in various ways, in such modulator embodiments. A modulator can be configured, in various embodiments, such that the voltage applied to a first drive electrode is lower than the voltage applied to a second drive electrode. In some embodiments, a modulator can be further configured to automatically switch from applying the voltage to a first drive electrode to applying the voltage to a second drive electrode when a predetermined event occurs.

In a system embodiment, an electrooptical system can include a radio frequency (RF) receiver to receive a RF signal and an electrooptical modulator to receive an electrical signal associated with the RF signal. The electrooptical modulator, e.g. a Mach-Zehnder modulator, in such a system embodiment can include an optical signal input, an optical signal output, a first optical path, and a second optical path.

The first optical path can, in various embodiments, extend from the input to the output, and can be associated with a first drive electrode. The second optical path can, in various embodiments, extend from the input to the output, and can be associated with a second drive electrode. In an embodiment of these optical paths, a first drive electrode can have a first electrical path length, a second drive electrode can have a second electrical path length, and the first electrical path length can be longer than the second electrical path length.

In such modulator system embodiments, a modulator can be configured in various ways. A modulator of such system embodiments can be configured to apply an electrical signal as a voltage input to a first drive electrode until a predetermined voltage threshold is reached. The modulator of such system embodiments can be configured to apply the voltage input to the first drive electrode below the voltage threshold and to apply the voltage input to the second drive electrode once the predetermined voltage threshold is reached. In some embodiments, the modulator of the system can be configured such that the voltage input applied to the first drive electrode is lower than the voltage input applied to the second drive electrode. In various embodiments, the predetermined voltage threshold is determined by determining at what voltage a distortion is formed by the voltage input.

In various system embodiments, the electooptical modulator includes a switch circuit to apply the voltage input to the first drive electrode below the predetermined voltage threshold and apply the voltage input to the second drive electrode once the predetermined voltage threshold is reached.

In various embodiments, the first modulator electrode, associated with the first optical path, can be located a distance from the first optical path that is different than the distance that the second modulator electrode, associated with the second optical path, is from the second optical path.

Also, in various embodiments, an electrooptical system can be an electronics warfare, a radar, or a communication system.

DETAILED DESCRIPTION

Embodiments of the present disclosure include methods, systems, and devices for modulating an optical signal. A method embodiment includes receiving an optical input signal to an electrooptical modulator, applying a first voltage input to a first drive electrode associated with a first optical path in the modulator, and applying a second voltage input to a second drive electrode associated with a second optical path in the modulator at times alternative to applying the first voltage input to the first drive electrode.

A device embodiment includes an optical signal input, an optical signal output, and a first optical path from the input to the output, wherein the first optical path is associated with a first drive electrode having a first drive electrode length. In this device embodiment, the modulator is configured to have a first voltage applied to the first drive electrode until a particular event occurs. This embodiment further includes a second optical path from the input to the output, wherein the second optical path is associated with a second drive electrode having a second drive electrode length, and the modulator is configured to have a second voltage applied to the second drive electrode once the particular event occurs.

Various embodiments of the present disclosure include drive electrodes of different lengths such that the drive electrodes can present different voltages (Vpi), e.g., a high and a low Vpi. The modulation sensitivity of an optical signal due to a voltage on the electrodes is often characterized in terms of a voltage, Vpi. Vpi for a Mach Zehnder modulator is the voltage needed to completely transfer the optical signal from the input to the output. Embodiments of the present disclosure can extend the Spur-Free-Dynamic-Range (SFDR) of photonic links that use an electrooptic modulator as an electrooptic converter.

Figure 1:
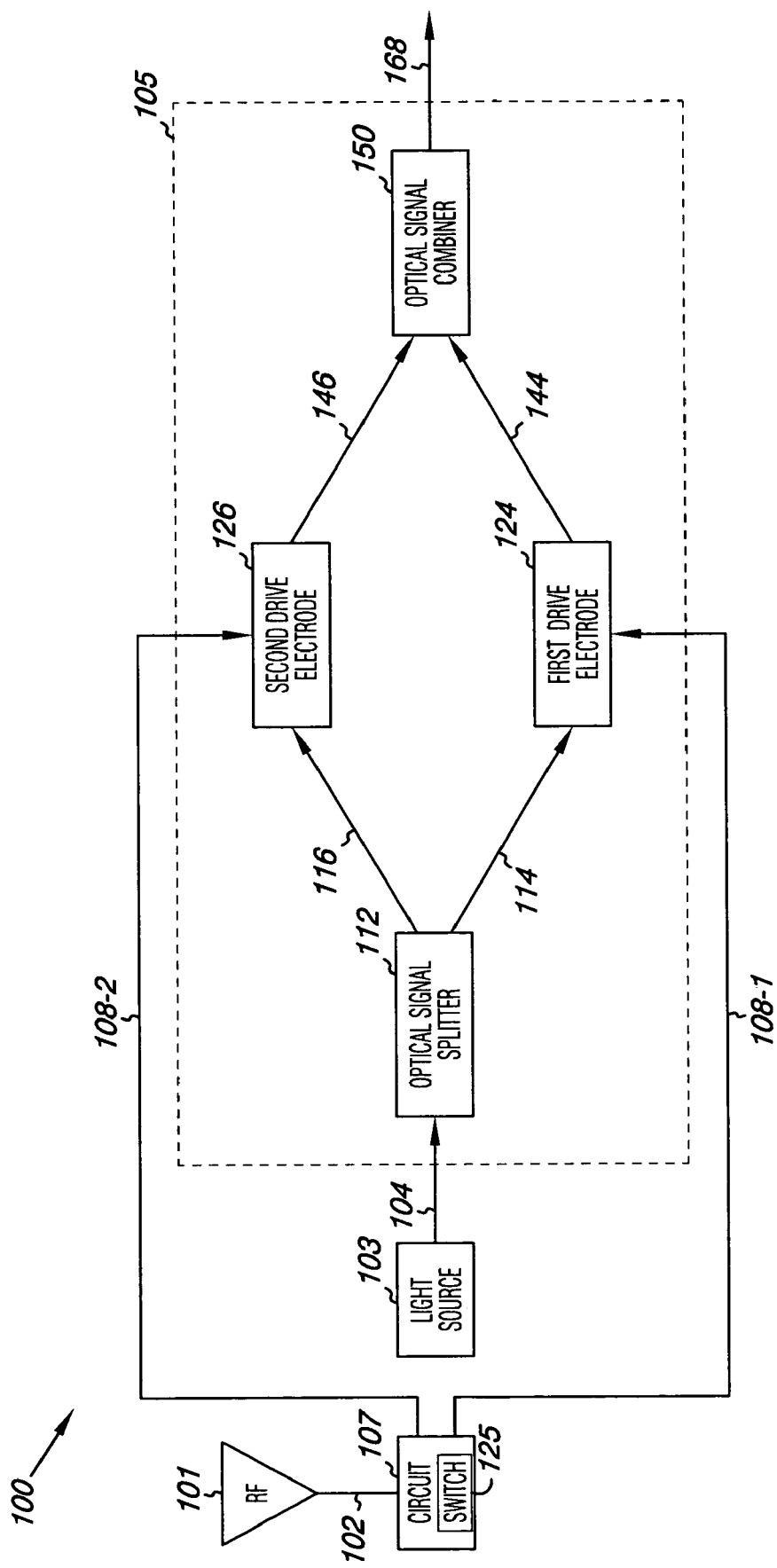
FIG. 1 is an electrooptical system embodiment according to the present disclosure.

FIG. 1 is an electrooptical system embodiment according to the present disclosure. In the embodiment illustrated in FIG. 1, electrooptical system 100 includes a radio frequency (RF) receiver 101 (e.g., an antenna), a light source 103, a circuit 107, and an electrooptical modulator 105.

An optical input signal 104 can be provided by light source 103 and received by the modulator 105. Examples of light sources can include lasers, lamps, and other conventional light sources. Examples of lasers include gas lasers, such as He—Ne lasers, solid state lasers, semiconductor lasers, such as laser diodes, and fiber lasers, among others. Examples of lamps include light emitting diodes, incandescent lamps, and fluorescent lamps, to name a few.

The optical input signal 104 can be split, by an optical signal splitter at 112, into a first incoming optical signal 114 and a second incoming optical signal 116. First incoming optical signal 114 follows a first optical path 114 past a first drive electrode 124 through portion 144 to an optical combiner at 150. Second incoming optical signal 116 follows a second optical path 116 subject to a second drive electrode 126 and transmitted to the optical combiner at 150 via portion 146. The first and second drive electrodes 124 and 126 can be driven by the same, or separate, sets of circuitry.

In the embodiment of FIG. 1, the modulator 105 also includes an optical signal combiner at 150 that combines outgoing optical signals 144 and 146 into an optical output signal 168.

As will be discussed in more detail below, a first voltage input can be applied to the first drive electrode 124, and a second voltage input can be applied to the second drive electrode 126. In the embodiment illustrated in FIG. 1, the circuit 107 includes a switch 125 that circuit 107 can control, in various embodiments, in order to apply or discontinue to apply a voltage input to a drive electrode, e.g., in order to select or deselect the first drive electrode 124 or the second drive electrode 126. That is, circuit 107 can transmit a signal 108-1 to apply a voltage to electrode 124 and a signal 108-2 to apply a voltage to electrode 126 by controlling switch 125. Switch 125 can be internal or external to circuit 107 and can be a pin diode switch, a radio frequency micro-electro-mechanical system (RF MEMS) switch or a gallium arsenide field effect transistor (GaAs FET) switch, among other switches.

In the system embodiment illustrated in FIG. 1, a RF signal can be received by RF receiver 101 and transmitted as an electrical signal 102 to circuit 107. RF receiver 101 can include a RF antenna or other RF receiver capable of providing an electrical signal based on a received RF signal.

In various embodiments, electrical signal 102 can be an input voltage signal that is based on the intensity/power of the RF signal received by receiver 101. That is, input voltage signal 102 can correspond to an input voltage that can be applied to drive electrode 124 or 126. For example, circuit 107 can control switch 125 in order to apply the voltage associated with voltage input signal 102 to the first drive electrode 124 or the second drive electrode 126 via signal 108-1 and 108-2, respectively.

In various embodiments, if the voltage input signal 102 received by circuit 107 is below a predetermined threshold, e.g., below 4 volts, then circuit 107 can control switch 125 in order to send a control signal 108-1 to select the first drive electrode, e.g., to apply the input voltage to the first drive electrode. In this example, if the input voltage is above a predetermined threshold, e.g., above 4 volts, then circuit 107 can control switch 125 in order to send a control signal 108-2 to deselect the first drive electrode 124 and select the second drive electrode 126, e.g., to apply the determined input voltage to the second drive electrode.

In this manner, the voltage input, e.g., the voltage corresponding to a received RF signal intensity, can be automatically applied to one electrode and discontinued from being applied to the other electrode upon reaching or exceeding a predetermined voltage input threshold. It should be noted that the first input voltage and second input voltage can be parts of a continuous voltage flowing into the modulator. Accordingly, the first and second voltage inputs can be discrete pulses of power or parts of a continuous signal that has relative high and low voltage sections. It should also be noted that switching between applying the determined input voltage to the drive electrodes can change the gain of the link. This change in gain can be a predetermined amount recognized by logic circuitry of system 100, e.g., circuit 107, or can be determined by logic circuitry of system 100, e.g., circuit 107.

In various embodiments, switch 125 can be controlled manually, e.g., by a user of an input/output device. For example, a user can control switch 125 in order to apply an input voltage to a drive electrode, e.g., 124 or 126, before a predetermined voltage limit is reached. For instance, in the above example, a user could manually operate switch 125 in order to apply an input voltage below 4 volts to the first electrode 124 or in order to apply a an input voltage above 4 volts to the second electrode 126.

Figure 2:
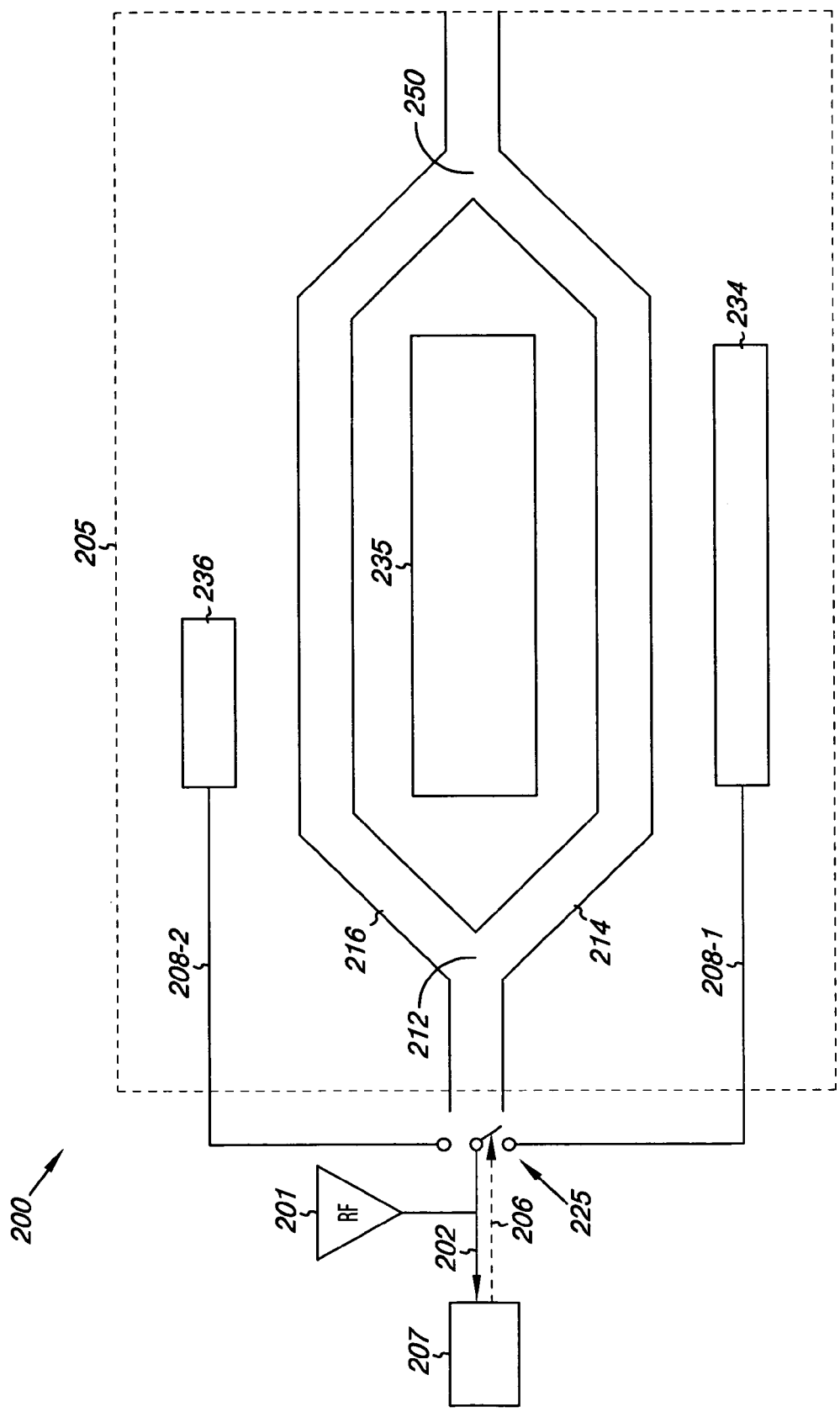
FIG. 2 is an electrooptical system including an electrooptical modulator embodiment of the present disclosure.

FIG. 2 is an electrooptical system 200 including an electrooptical modulator embodiment of the present disclosure. In the embodiment of FIG. 2, system 200 includes a RF receiver 201, a circuit 207, a switch 225, and an electrooptical modulator 205. In this embodiment, modulator 205 is a Mach-Zehnder modulator. As previously mentioned, modulator 205 can be a traveling wave or a lumped element Mach-Zehnder modulator, among other modulators.

In the embodiment of FIG. 2, the modulator 205 includes a first optical path 214 and a second optical path 216. The modulator 205 includes a first drive electrode 234, associated with the first optical path 214, and a second drive electrode 236, associated with the second optical path 216. In the embodiment of FIG. 2, modulator 205 also includes a ground electrode 235, which serves as a reference electrode for an input voltage as discussed below.

As discussed in connection with FIG. 1, an optical input signal, e.g., signal 104 of FIG. 1, can be split by a signal splitter at 212 into a first incoming optical signal that can travel down first optical path 214 and a second incoming optical signal that can travel down second optical path 216. The optical input signal can then be recombined by a signal combiner, e.g., combiner 150, located at 250.

As will be discussed below, the first incoming optical signal may or may not be phase modulated upon arriving at a combiner at 250, depending on whether or not a first drive electrode 234 is presented with a drive voltage, i.e., depending on whether or not drive electrode 234 is selected. Similarly, the second incoming optical signal may or may not be phase modulated upon arriving at a combiner at 250, depending on whether or not a second drive electrode 236 is presented with a drive voltage, i.e., depending on whether or not drive electrode 236 is selected.

In the system embodiment illustrated in FIG. 2, a RF signal can be received by RF receiver 201. As discussed above in connection with FIG. 1, the received RF signal corresponds to an input voltage that can be applied to the first drive electrode 234 or the second drive electrode 236, depending on which electrode is selected by using switch 225. In various embodiments, the switch 225 can be operated automatically or manually.

In the embodiment of FIG. 2, electrical signal 202 represents an input voltage based on the intensity/power of a received RF signal. In this embodiment, circuit 207 can control switch 225 automatically based on the received RF signal intensity, i.e., based on the input voltage signal 202. That is, circuit 207 can be used to select and deselect the drive electrodes 234 and 236 based on the input voltage signal 202.

For example, as discussed above, if the input voltage signal 202 is below a predetermined threshold, e.g., below 4 volts, then circuit 207 can control switch 225 in order to select the first drive electrode 234, e.g., to apply the input voltage signal 202 to the first drive electrode 234 via electrical signal 208-1. In this example, if circuit 207 determines the input voltage signal 202 is above a predetermined threshold, e.g., above 4 volts, then circuit 207 can control switch 225 in order to deselect the first drive electrode 234 and to select the second drive electrode 236 via electrical signal 208-2, e.g., to apply the input voltage 202 to the second drive electrode. In this manner, in the embodiment illustrated in FIG. 2, electrode switch 225 can be controlled, e.g., by circuit 207, to automatically apply or discontinue to apply a voltage to drive electrodes 234 and 236, respectively.

As discussed in detail in connection with the method embodiments illustrated in FIGS. 4 and 5, a first voltage can be applied to a first drive electrode, until a particular event occurs. For instance, a first voltage can be applied to electrode 234 until a certain voltage, e.g., until a received RF signal intensity/power is reached. Applying the first voltage can then be discontinued, and a second voltage can be applied to a second drive electrode. For example, the second voltage can be applied to electrode 236 by deselecting electrode 234 via switch 225 and selecting electrode 236 via switch 225. That is, the voltage input can be automatically switched from being applied to electrode 234 to being applied to electrode 236 by operating switch 225 based on input voltage signal 202.

In the embodiment illustrated in FIG. 2, the switch 225 can also be manually operated in order to apply a voltage input signal 202 to drive electrode 234 or 236. That is, an electrical signal 206 can be sent to switch 225 from circuit 207 or from an input/output device, for example. A user may, for instance, manually switch from a low Vpi electrode to a high Vpi electrode before the predetermined voltage threshold is reached.

The electrodes 234 and 236 illustrated in the embodiment of FIG. 2 have different lengths, e.g., electrode 234 is shown as being longer than electrode 236. Providing drive electrodes of different lengths for the split optical input paths of a modulator, e.g., modulator 205, can allow the drive electrodes, e.g., 234 and 236, to present different Vpis, e.g., a high and a low Vpi. Additionally, according to various embodiments, the Vpi of the second drive electrode 236 may be greater than the Vpi of the first drive electrode 234.

In various embodiments, the longer first drive electrode 234 presents a lower Vpi and the shorter second drive electrode 236 presents a higher Vpi. That is, as previously mentioned above, the voltage input can be determined based on an RF signal intensity. Therefore, the determined voltage input can be applied to the lower Vpi electrode, e.g., the longer electrode 234, until the voltage input, i.e., the RF signal intensity, reaches a voltage input threshold.

Upon reaching the voltage input threshold, the determined voltage input can be discontinued from being applied to the lower Vpi electrode and can be switched to be applied to the higher Vpi electrode (either automatically or manually via switch 225).

The sensitivity of the modulator 205 depends on which electrode a voltage is applied to, e.g., whether the input voltage signal 202 is applied to the first electrode or the second electrode via switch 225. For instance, the modulator 205 is sensitive to smaller voltage input signals, without exceeding distortion limits, when the lower Vpi electrode is presented, e.g., when a first voltage is applied to the longer electrode 234. The modulator 205 can handle larger voltage input signals, e.g., higher power RF signals, without exceeding distortion limits, when the higher Vpi electrode is presented (e.g., when a second voltage is applied to the shorter electrode 236).

As one of ordinary skill in the art will appreciate, there are various other ways to configure an electrooptic modulator in order to present different sensitivities, e.g., a high and a low Vpi. For example, as discussed in connection with FIG. 3, the drive electrodes, e.g., 234 and 236, can be located different distances from the optical paths they influence.

Figure 3:
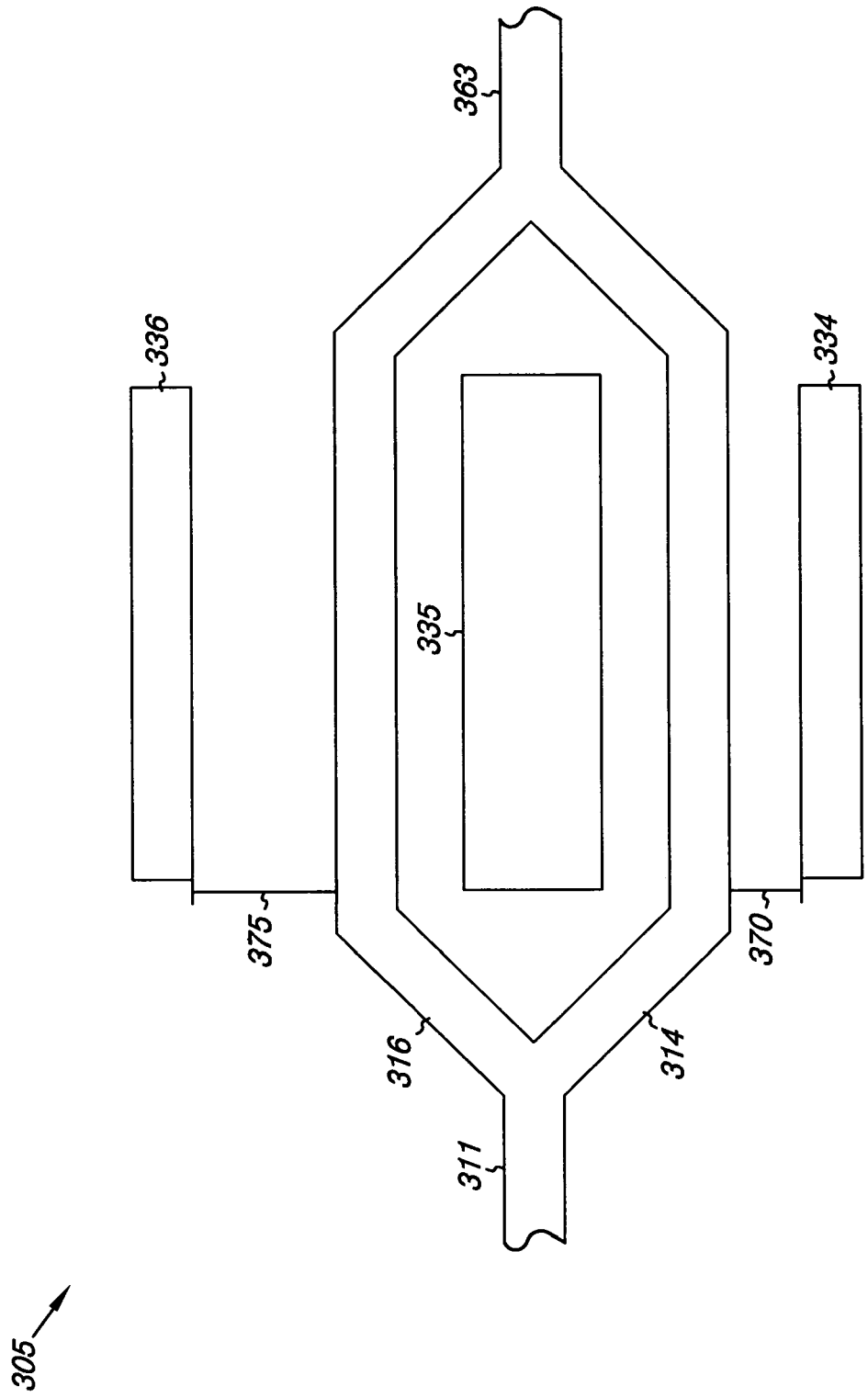
FIG. 3 is another electrooptical modulator embodiment of the present disclosure.

FIG. 3 is another electrooptical modulator embodiment of the present disclosure. In the embodiment of FIG. 3, the modulator 305 includes an optical input path 311, which is split into a first optical path 314 and a second optical path 316. As discussed above, the first and second optical paths are recombined at optical output path 363. The embodiment of FIG. 3 also includes a first drive electrode 334, associated with optical path 314, a second drive electrode 336, associated with optical path 316, and a ground electrode 335.

In this embodiment, the first drive electrode 334 is located a first distance 370 from optical path 314 and the second drive electrode 336 is located a second distance 375 from optical path 316 in order to provide different sensitivities, e.g., different Vpis. It is noted that the drive electrodes can be located in-plane or out-of-plane with respect to the optical paths they influence.

As discussed above, a control circuit, e.g., circuit 107, can operate a switch, e.g., switch 125, in order to present a low Vpi (higher sensitivity) electrode when a received RF signal is below a threshold power/intensity level and to present a high Vpi (lower sensitivity) electrode when a received RF signal is above a threshold power/intensity level. For example, a voltage input can be applied to electrode 334 until the received RF signal, e.g., the received voltage input, reaches a predetermined voltage limit. Upon reaching the predetermined voltage limit, the voltage input can be switched to electrode 336 in order to present a decreased sensitivity to allow modulator 305 to be sensitive to stronger received RF signals without exceeding distortion limits.

In the embodiment illustrated in FIG. 3, the drive electrodes 334 and 336 are shown as being of equal lengths. However, embodiments are not limited to equal length electrodes.

Figure 4:
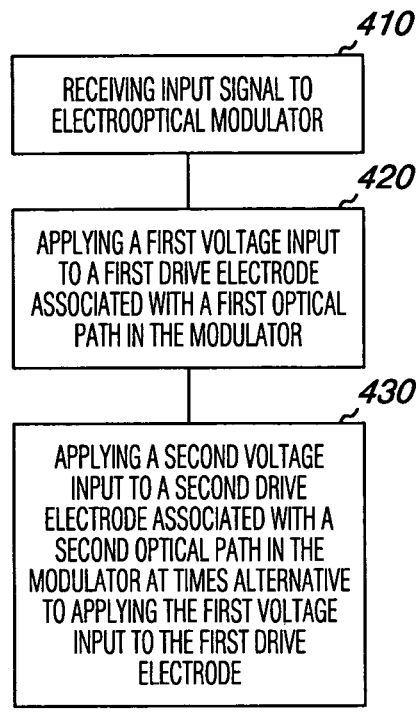
FIG. 4 illustrates a method embodiment for modulating an optical signal.

FIG. 4 illustrates a method embodiment for modulating an optical signal. As described at block 410, the method includes receiving an input signal to an electrooptical modulator. This input signal can be received from various other devices, as described in connection with FIG. 1.

The input signal of block 410 can be an optical signal (e.g. a light beam from a laser or other light source), which can include encoded information, such as voice, data, and/or sensor information. This input signal can be received to an electrooptical modulator in various ways, such as through an optical signal input, as described in connection with FIGS. 1-3. For example, in some embodiments, the electrooptical modulator of block 410 can be a Mach-Zehnder modulator.

The method, as described at block 420, includes applying a first voltage input to a first drive electrode associated with a first optical path in the modulator of block 410. This applying of the first voltage input can be accomplished by using a control circuit and switch as described in connection with FIGS. 1 and 2.

By applying the first voltage to the first drive electrode, the modulator can affect an optical signal in the first optical path, thereby delaying its transmission through the first optical path. This delay can create an optical output signal, as described in connection with FIG. 1, when the optical signal in the first optical path is combined with an optical signal in a second optical path, such as the optical path described at block 430.

At block 430, the method of FIG. 4 includes applying a second voltage input to a second drive electrode associated with a second optical path in the modulator of block 410. The second voltage input is applied to the second drive electrode at times alternative to applying the first voltage input to the first drive electrode. Applying the second voltage input can be accomplished in a manner similar to applying the first voltage input with a similar effect. In various embodiments, of the present disclosure, a length of the first drive electrode of block 420 can be different (e.g. longer) than a length of the second drive electrode of block.

This difference in drive electrode lengths can result in phase modulations of different sensitivities, as described in connection with FIGS. 2 and 3. For example, a shorter drive electrode can result in a lower sensitivity phase modulation and a longer drive electrode can result in a higher sensitivity phase modulation.

The first voltage input can be different than (e.g. lower than or less than) the second voltage input, in various embodiments. This difference in voltage can result in phase modulations with different delays. For example, a lower voltage can result in a phase modulation with a short delay and a higher voltage can result in a phase modulation with a longer delay.

In various embodiments of the present disclosure, a distance of the first drive electrode from the first optical path of block 420 can be different, e.g., closer, than a distance of the second drive electrode from the second optical path of block 430. This difference in distance can result in phase modulations of different sensitivities, as described in connection with FIG. 3. For example, a drive electrode that is closer to the optical path can result in a lower sensitivity phase modulation and a drive electrode that is farther from the optical path can result in a higher sensitivity phase modulation.

The second voltage, at block 430 is applied at times alternative to applying the first voltage input to the first drive electrode, as described in connection with block 420. In various embodiments, these alternative times can be based upon various events related to modulating the optical signal in the method of FIG. 4. The method embodiment of FIG. 4 includes applying the first voltage input to the first drive electrode until a particular voltage input threshold is reached, then discontinuing to apply the first voltage input to the first drive electrode and switching to apply the second voltage input to the second drive electrode.

A receiver circuit, as described in connection with FIG. 1, can be used, in some embodiments, to detect a magnitude of the voltage input signal, compare it with a particular predetermined magnitude, and determine whether the voltage input signal reaches the particular preset magnitude. As discussed above, the voltage input signal can be determined based on the power/intensity of a received RF signal.

In such embodiments, a switch can be used, as described in connection with FIGS. 1 and 2, to discontinue applying the voltage input signal, e.g. signal 202, to the first drive electrode and to apply it instead to the second drive electrode. Due to this switching, the modulator in the method of FIG. 4 can effectively switch from lower intensity phase modulation to greater intensity phase modulation (e.g., from a low Vpi electrode to a high Vpi electrode) to limit distortions in an interferometric modulator. As a result of performing such method embodiments, an electrooptical modulator can provide intensity modulation over an extended SFDR, without using additional devices or extra circuitry.

Figure 5:
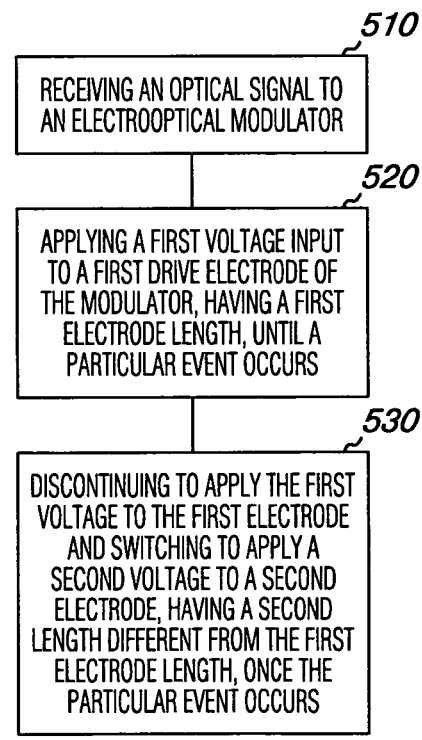
FIG. 5 illustrates another method embodiment for modulating an optical signal.

FIG. 5 illustrates another method embodiment for modulating an optical signal. The method embodiment includes receiving an optical signal to an electrooptical modulator, e.g., the modulator described in the embodiment illustrated in FIG. 2, at block 510, as the same has been described above. The method embodiment of FIG. 5 also includes applying a first voltage input to a first drive electrode of the modulator, having a first electrode length, until a particular event occurs at block 520.

As described herein, the particular event may be an event such as a voltage input signal reaching a particular threshold voltage. As discussed above, the voltage input signal can be determined based on the intensity/power of an RF signal received to an RF receiver.

In various embodiments, the particular event can be a manual selection by using an I/O device, for example. That is, a switch circuit can control a switch to turn a drive electrode on/off based on a manual selection.

The method embodiment of FIG. 5 includes discontinuing to apply the first voltage input to the first drive electrode and switching to apply a second voltage input to a second drive electrode, having a second electrode length different from the first electrode length, once the particular event occurs at block 530.

In various embodiments, the method can include applying a first voltage input, which is lower than the second voltage input, to a first electrode that is longer than the second electrode. As described herein, applying a voltage that is lower than a particular voltage input threshold to the longer electrode and applying a voltage that is higher than the particular voltage input threshold to the shorter electrode results in the ability to present a low and a high Vpi electrode.

Also as described herein, an embodiment's ability to switch between a high and a low Vpi electrode can extend the SFDR by adjusting the sensitivity of an electrooptic modulator in a photonic link. That is, the sensitivity of a modulator can be decreased (by switching to the high Vpi electrode) when a received RF signal intensity increases such that the voltage input threshold is reached. The decreased sensitivity can allow the modulator to be sensitive to stronger received RF signal intensities without exceeding distortion limits.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of modulating an optical signal, comprising:
   receiving an optical input signal to an electrooptical modulator;
   receiving a radio frequency (RF) signal having an associated intensity level;
   determining a voltage input to be applied to one of a first drive electrode and a second drive electrode, wherein a magnitude of the voltage input is based on the associated intensity level of the received RF signal;
   applying the voltage input to the first drive electrode associated with a first optical path in the electrooptical modulator; and
   applying the voltage input to the second drive electrode associated with a second optical path in the electrooptical modulator at times alternative to applying the voltage input to the first drive electrode.

2. The method of claim 1, wherein the method includes applying the voltage input to the first drive electrode having a first electrode length different from a second electrode length of the second drive electrode.

3. The method of claim 2, wherein applying the voltage input to the first drive electrode includes applying the voltage input to the first drive electrode when the magnitude of the voltage input is lower than the magnitude of the voltage input when the voltage input is applied to the second drive electrode.

4. The method of claim 3, wherein applying the voltage input to the first drive electrode includes applying the voltage input to a first electrode length which is longer than the second electrode length.

5. The method of claim 4, wherein the method includes:
   applying the voltage input to the first drive electrode until a particular magnitude of the voltage input is reached; and
   discontinuing to apply the voltage input to the first drive electrode and switching to apply the voltage input to the second drive electrode once the particular magnitude of the voltage input has been reached.

6. The method of claim 1, wherein the method includes applying the voltage input to the first drive electrode, the first drive electrode being located a distance from the first optical path different than a distance that the second drive electrode is located from the second optical path.

7. A method of modulating an optical signal, comprising:
   receiving an optical input signal to an electrooptical modulator;
   applying a voltage input to a first drive electrode of the modulator, having a first electrode length, until a particular event occurs; and
   discontinuing to apply the voltage input to the first drive electrode and switching to apply the voltage input to a second drive electrode, having a second electrode length different from the first electrode length, once the particular event occurs; and
   wherein a magnitude of the applied voltage input changes in response to an intensity level change of a received radio frequency signal.

8. The method of claim 7, wherein the magnitude of the voltage input is lower when the voltage input is applied to the first drive electrode than when the voltage input is applied to the second drive electrode, and wherein the method includes
   applying the voltage input to a first electrode length which is longer than the second electrode length.

9. The method of claim 7, wherein the method includes switching to apply the voltage input to the second drive electrode upon a manual selection.

10. The method of claim 7, wherein the method includes automatically switching to apply the voltage input to the second drive electrode upon an electrooptical event.

11. The method of claim 10, wherein the method includes automatically switching to apply the voltage input to the second drive electrode when a predetermined distortion limit has been reached.

12. The method of claim 7, wherein the particular event is the exceeding of a voltage threshold by the voltage input.

13. An electrooptical modulator, comprising:
   an optical signal input;
   an optical signal output;

a first optical path from the input to the output, wherein the
  first optical path is associated with a first drive electrode
  having a first drive electrode length;
a second optical path from the input to the output, wherein
  the second optical path is associated with a second drive
  electrode having a second drive electrode length; and
control circuitry including a switch element, the control
  circuitry coupled to a radio frequency receiver and configured to:
  apply a voltage input to a first drive electrode, a magnitude of the voltage input corresponding with a received radio frequency signal intensity; and
  switch from applying the voltage input to the first drive electrode to applying the voltage input to a second drive electrode such that the voltage input is applied to the first drive electrode at times different from the voltage input being applied to the second drive electrode.

14. The modulator of claim 13, wherein the first drive electrode length is longer than the second drive electrode length and wherein the modulator is configured such that the magnitude of the voltage input to be applied to the first drive electrode is lower than the magnitude of the voltage input when the voltage input is applied to the second drive electrode.

15. The modulator of claim 13, wherein:
the voltage input is applied to the first drive electrode until a particular voltage is reached; and
the voltage input is applied to the second drive electrode once the particular voltage has been reached.

16. An electrooptical modulator, comprising:
an optical signal input;
an optical signal output;
a first optical path from the input to the output, wherein the first optical path is associated with a first drive electrode having a first drive electrode length, the modulator being configured to have a voltage applied to the first drive electrode until a particular event occurs; and
a second optical path from the input to the output, wherein the second optical path is associated with a second drive electrode having a second drive electrode length, the modulator being configured to have the voltage applied to the second drive electrode once the particular event occurs;
wherein a magnitude of the voltage changes in response to received radio frequency signal changes; and wherein the voltage is applied to the first drive electrode at times alternative to being applied to the second drive electrode such that the voltage is applied to only one of the first and the second drive electrode at a time.

17. The modulator of claim 16, wherein the first drive electrode length is longer than the second drive electrode length, and wherein the modulator is configured such that the voltage applied to the first drive electrode is lower than the voltage applied to the second drive electrode.

18. The modulator of claim 16, wherein the particular event includes a manual selection.

19. The modulator of claim 16, wherein the particular event includes an electrooptical event.

20. The modulator of claim 16, wherein the modulator is configured such that the voltage applied to the second drive electrode once the particular event is reached is greater than the voltage, applied to the first drive electrode, and wherein the modulator is configured to automatically switch to applying the voltage to the second drive electrode when the predetermined event occurs.

21. An electrooptical system, comprising:
a radio frequency (RF) receiver to receive a RF signal;
an electrooptical modulator to receive an electrical signal associated with the RF signal, wherein the electrooptical modulator includes:
an optical signal input;
an optical signal output;
a first optical path from the input to the output, wherein the first optical path is associated with a first drive electrode, the modulator being configured to apply the electrical signal as a voltage input applied to the first drive electrode until a predetermined voltage threshold is reached; and
a second optical path from the input to the output, wherein the second optical path is associated with a second drive electrode, the modulator being configured to:
apply the voltage input to the first drive electrode until the predetermined voltage threshold is reached; and
apply the voltage input to the second drive electrode once the predetermined voltage threshold is reached.

22. The system of claim 21, wherein the first drive electrode has a first electrical path length and the second drive electrode has a second electrical path length, and wherein the first electrical path length is longer than the second electrical path length.

23. The system of claim 21, wherein the modulator is configured such that the voltage input applied to the first drive electrode until the predetermined voltage threshold is reached is lower than the voltage input applied to the second drive electrode once the voltage threshold is reached.

24. The system of claim 21, wherein the modulator is a Mach-Zehnder modulator.

25. The system of claim 21, wherein the system is an electronics warfare system.

26. The system of claim 21, wherein the system is a communication system.

27. The system of claim 21, wherein the electrooptical modulator includes a switch circuit operated to:
apply the voltage input to the first drive electrode until the predetermined voltage threshold is reached; and
apply the voltage input to the second drive electrode once the predetermined voltage threshold is reached.

28. The system of claim 21, wherein the first drive electrode is located a first distance from the first optical path and the second drive electrode is located a second distance from the second optical path, and wherein the first distance is different than the second distance.

29. The system of claim 21, wherein the predetermined voltage threshold is determined by determining at what voltage a distortion is formed by the voltage input.

* * * * *